Nov. 4, 1952     J. STRANGE     2,616,733
FASTENING DEVICE
Filed Dec. 28, 1948
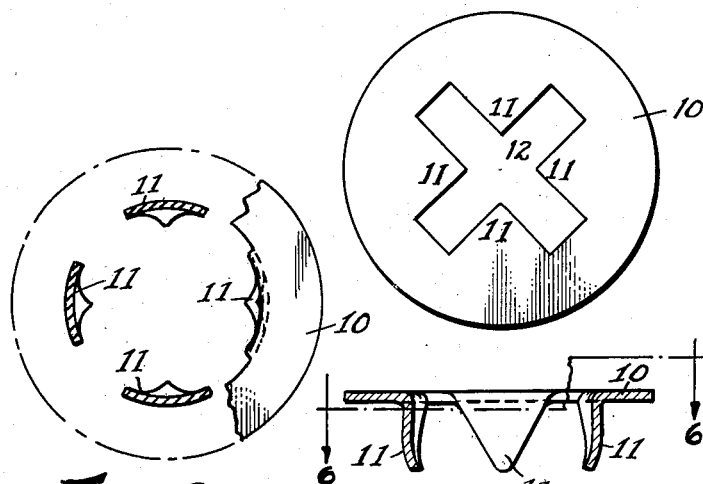
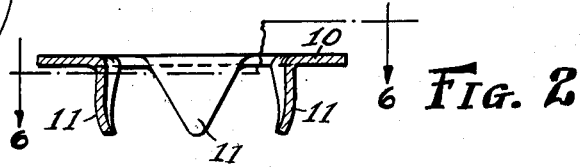
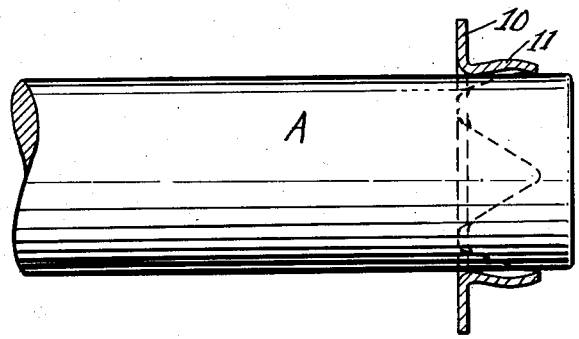
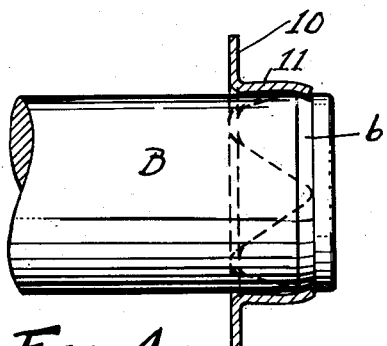
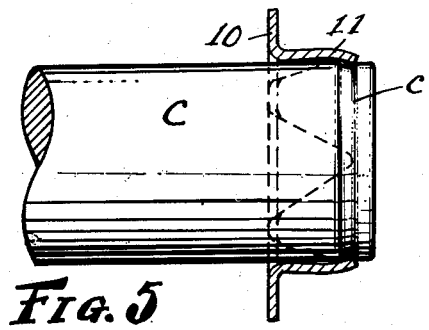
INVENTOR.
JOHN STRANGE
BY
Bates, Teare, & McKean
Attorneys Patented Nov. 4, 1952

2,616,733

UNITED STATES PATENT OFFICE 2,616,733

FASTENING DEVICE

John Strange, Cardiff, Wales, assignor to Tinnerman Products, Inc., Cleveland, Ohio, a corporation of Ohio Application December 28, 1948, Serial No. 67,737
In Great Britain August 9, 1948

2 Claims. (Cl. 287—52)

This invention relates to a fastening device adapted to be mounted on a shaft or rod to form an abutment for positioning a bushing, a wheel, a link or other member surrounding the shaft or rod. The fastening device is made of resilient sheet material and holds itself in place by its own resiliency. The invention comprises not only the fastening device per se but also an assembly comprising such fastening device and the shaft or rod on which it is mounted.

The fastening device is illustrated in an approved form in the drawing which shows it mounted on different forms of shaft. In the drawing, Fig. 1 is a plan of a blank from which the fastening device is made by bending; Fig. 2 is a cross section of the completed fastening device; Fig. 3 is a sectional elevation of the fastening device mounted on a continuously cylindrical shaft; Fig. 4 is a sectional elevation of the fastening device on a shaft having one form of peripheral groove therein receiving the edge of the fastener; Fig. 5 is a similar view with a shaft-groove of somewhat different form; Fig. 6 is a view of the fastener, partly in plan and partly in horizontal section.

The fastening device according to this invention comprises a base member 10 and a plurality of resilient prongs 11 extending at an angle thereto and lying in a circuit adapted to surround a shaft. The fastener is made by taking a disc of resilient sheet material and forming through it a central opening preferably in the nature of a Greek cross, as shown at 12 in Fig. 1, and then bending the remaining prongs 11 inwardly at approximately right angles to the base though directed slightly toward the axis and transversely curving them, so that they stand as a group in substantially cylindrical formation, as shown in Fig. 6.

When such a device as shown in Fig. 2 is mounted on a shaft, for instance, the cylindrical shaft A of Fig. 3, the prongs hug the shaft with sufficient grip to prevent inadvertent shifting of the fastener axially along the shaft. Accordingly the base of the mounted device provides an abutment limiting the movement of a member on the shaft.

The prongs 11 of the finished fastener incline inwardly toward the axis of the fastener and are preferably of slight ogee formation the distance between the tips of opposed prongs being slightly less than the diameter of the shaft. Accordingly when the device is pushed onto the shaft the free end portions of the prongs are spaced apart and the resultant stressing of the prongs causes them to grip the shaft and hold the fastener in place.

Where it is desired to locate the fastener at a definite position on the shaft, the shaft may be formed with an annular groove into which the tips of the prongs project when the device is pushed onto the shaft to the desired extent. In Fig. 4 the shaft B is provided with such a groove b, and in this instance the groove is shown with an abrupt shoulder engaged by the ends of the prongs 11, so that movement of the fastener toward the right hand is definitely prevented, while movement by a sufficient force may be made in the left hand direction.

In Fig. 5, I have shown at C a shaft with a rounded groove c receiving the ends of the prongs 11 and definitely locating the fastener but allowing it by the application of a proper force to be shifted in either direction.

My fastener may be readily made by simple operations; may be of sheet spring steel or Phosphor bronze or other suitable material. It is simple in construction, readily applied and when applied holds itself in place so that it may form a desired abutment for some device mounted on the shaft.

I claim:

1. A fastening device made of a single piece of resilient flat sheet material formed with a cruciform opening therein to provide a series of integral prongs turned at right angles from the body and all projecting in the same general direction towards pointed ends, each of said prongs being transversely curved and concave on the inner face, whereby they stand in a substantially circular course normal to the body, the extreme pointed ends of each of the prongs normally extending inwardly farther than the root of the prongs where they join the body.

2. The combination with a shaft having a circumferential groove therein, of a fastener of resilient sheet material comprising a flat disc having a cruciform opening therein to provide a series of radially opposed prongs turned at right angles from the disc and projecting in the same general direction towards pointed ends, each prong being transversely curved and concave at the inner face, whereby they stand in a substantially circular course normal to the disc, the extreme pointed ends of the prongs normally extending inwardly farther than the root of the prongs where they join the disc and each pointed end thereof occupying the groove on the shaft.

JOHN STRANGE.

REFERENCES CITED

The following references are of record in the file of this patent:

UNITED STATES PATENTS

| Number | Name | Date |
|---|---|---|
| 406,150 | Scott | July 2, 1889 |
| 696,534 | Assel | Apr. 1, 1902 |
| 1,175,550 | Murray | Mar. 14, 1916 |
| 1,675,277 | Roe | June 26, 1928 |
| 2,140,441 | Clark | Dec. 13, 1938 |
| 2,140,442 | Clark | Dec. 13, 1938 |
| 2,266,049 | Köst | Dec. 16, 1941 |
| 2,483,013 | Kopprasch | Sept. 27, 1949 |